No. 848,266. PATENTED MAR. 26, 1907.
E. J. ROBBINS.
PIPE COUPLING.
APPLICATION FILED MAR. 14, 1906.

WITNESSES.
A. K. Hood.
Arthur Carroll

INVENTOR.
Edward J. Robbins.
By Berry W. Williams
Atty

UNITED STATES PATENT OFFICE.

EDWARD J. ROBBINS, OF BOSTON, MASSACHUSETTS.

PIPE-COUPLING.

No. 848,266.      Specification of Letters Patent.      Patented March 26, 1907.

Application filed March 14, 1906. Serial No. 306,031.

*To all whom it may concern:*

Be it known that I, EDWARD J. ROBBINS, a citizen of the United States, residing in Boston, in the county of Suffolk and State of Massachusetts, have invented certain new and useful Improvements in Pipe-Couplings, of which the following is a specification.

This invention relates to an improved pipe-coupling or union-joint; and it has for its principal object to provide a coupling which is easily applied, tightened, and loosened and which can be operated without the employment of a wrench.

The invention comprises a rotatable sleeve which embraces the adjacent ends of pipes, one of which is provided with an annular groove or channel, and a pair of wedges which extend through the sleeve into said groove on opposite sides of the pipe, said sleeve being also provided with a flange which extends inward behind a flange next the end of the pipe which is not provided with a groove. To apply the wedges tightly to the coupling, one or two taps with a small hammer are sufficient, and they can be removed in the same manner or by means of a pair of ordinary pliers. Hence tightening or loosening a coupling which is underground or in some place not easily ascessible, as is often the case in pipes connected with water-supplies and water-closets in houses, may be readily accomplished when a wrench could not be employed, and as the sleeve is rotatable it can be easily turned in order to present the ends of the wedges in any direction.

The nature of the invention is fully described below and illustrated in the accompanying drawing, in which—

Figure 1:
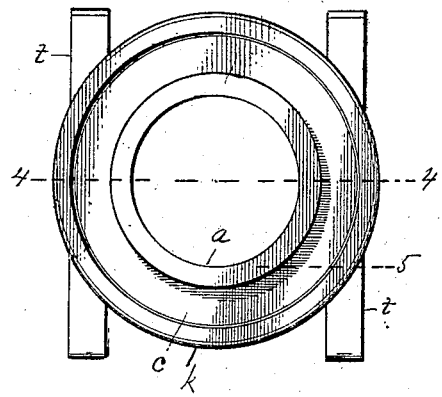
Figure 2:
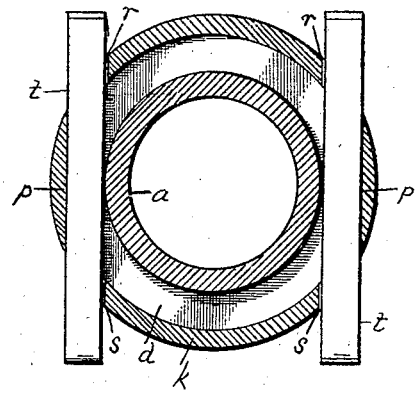
Figure 3:
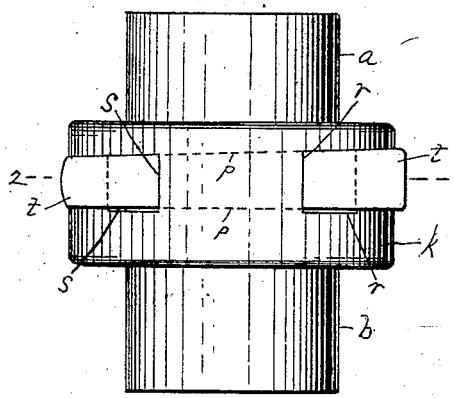
Figure 4:
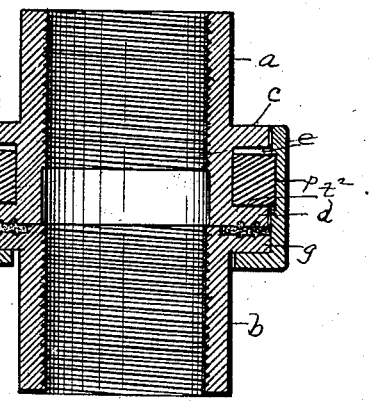
Figure 5:
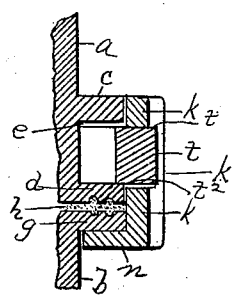

Figure 1 is an elevation showing my improved coupling applied to the adjacent ends of two pieces of pipe. Fig. 2 is a section taken on line 2 2, Fig. 3, the wedges being shown in elevation. Fig. 3 is a plan view of the same. Fig. 4 is a section taken on line 4 4, Fig. 1. Fig. 5 is a detail in section, taken on line 5, Fig. 1.

Similar letters of reference indicate corresponding parts.

*a* and *b* represent, respectively, the ends of two pipes which are to be coupled. The pipe *a* is provided with a pair of annular parallel flanges *c* and *d*, whereby a groove or channel *e* is formed on the outside of said pipe *a*, the flange *d* being at the extreme inner end of the pipe. The pipe *b* is provided at its extreme inner end with an annular flange *g*, corresponding in size and shape to the flange *d* and adapted to face it when the pipes are coupled. This flange *g* is preferably recessed to receive an ordinary packing *h*, or the packing may be omitted, so as to provide a ground joint, if desired.

*k* represents an annular sleeve of sufficient diameter and width to embrace rotatively the three flanges *c*, *d*, and *g*, and this sleeve or ring is provided at one edge with an inwardly-projecting annular flange *n*, which is adapted to overlap the outer side of the flange *g*. The inner surface of the sleeve or ring *k* is provided on its opposite sides with straight parallel grooves *p*, said grooves constituting chords of the circle described by the sleeve, and at the ends of the grooves on both sides the sleeve is provided with openings *r* and *s*. The opposite edges of these grooves are not parallel, but converge, as clearly shown by dotted lines in Fig. 3, and the openings *r* are wider than the openings *s* and are in line with the converging sides of the grooves *p*, and the walls of said openings are also in line with said converging sides.

*t* represents two wedges, preferably exactly alike, adapted to extend through the openings *r*, along the grooves *p* in the annular groove *e*, and out through the openings *s* and when in such position to fit into said openings *r* and *s* and grooves *p*.

When the parts are in the position indicated in the drawings the wedges *t* are driven in until they hold the two pipes *a* and *b* closely together, making a tight joint; or, to speak more exactly, (referring to Fig. 5,) each wedge is driven in until the one of its converging edges, which is lettered $t'$ in Fig. 5, is forced hard against the adjacent edges of the sleeve *k* next the openings *r* and *s*, while the opposite edge, which is lettered $t^2$ in Fig. 5, is forced hard against the inner surface of the flange *d*. Thus the wedge is driven between the sleeve and the flange *d* and forces said flange against the packing *h*, which lies between it and the flange *g*, making a tight joint. This edge $t^2$ is in continuous contact with the inner surface of the flange *d* for the entire distance between the opening *r* and the opening *s*, as indicated in Fig. 4. In practice it requires but a slight tap with any small tool to drive the wedges in sufficiently to render the joint tight, and a similar tap to withdraw them, or they may be withdrawn by means of small pliers. Inasmuch as small tools will do the work of tightening and loosening the joint, pipe-couplings constructed as above described may be located in obscure places or those which are not easily accessible and in places where a pipe-wrench or any wrench could not be applied or operated. The long bearings produced by the length of the two grooves $p$ render the frictional hold of the wedges very strong. As the sleeve $k$ is rotatable, it can be turned when the wedges are to be inserted so that the entrance-holes $r$ face the operator, thus facilitating the application and withdrawal of the wedges.

Having thus fully described my invention, what I claim, and desire to secure by Letters Patent, is—

In a pipe-coupling, a pair of pipes one of which is provided near its end with two flanges whereby an external groove is produced, and the other of which is provided at its end with a flange which when the pipes are joined faces the outer flange of the first-named pipe; a sleeve embracing all three said flanges and provided with pairs of openings, each pair being on a chord of the circle described by the sleeve and consisting of openings of different sizes, and the opening of each pair being connected by an internal groove; wedges adapted to be inserted in said pairs of openings and in the portion of the groove between the openings of each pair; and a flange extending inward from the sleeve and overlapping the farther surface of the single flange in one pipe, whereby the wedges are forced between the farther edges of the openings and the end flange on the pipe which is provided with two flanges, for the purpose set forth.

In testimony whereof I have signed my name to this specification in the presence of two subscribing witnesses.

EDWARD J. ROBBINS.

Witnesses:
   HENRY W. WILLIAMS,
   A. K. HOOD.